(12) United States Patent
Hoshino

(10) Patent No.: US 7,792,389 B2
(45) Date of Patent: Sep. 7, 2010

(54) IMAGE PROCESSING CONTENT DETERMINING APPARATUS, COMPUTER READABLE MEDIUM STORING THEREON IMAGE PROCESSING CONTENT DETERMINING PROGRAM AND IMAGE PROCESSING CONTENT DETERMINING METHOD

(75) Inventor: Masaru Hoshino, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 1063 days.

(21) Appl. No.: 11/503,349

(22) Filed: Aug. 10, 2006

(65) Prior Publication Data
US 2007/0036455 A1    Feb. 15, 2007

(30) Foreign Application Priority Data
Aug. 10, 2005   (JP)   ............................. 2005-232125

(51) Int. Cl.
*G06K 9/32*   (2006.01)
(52) U.S. Cl. ........................ 382/294; 382/278; 382/284; 358/540; 358/450
(58) Field of Classification Search ................. 382/284, 382/294, 295; 358/540, 450
See application file for complete search history.

(56) References Cited

U.S. PATENT DOCUMENTS

| | | | |
|---|---|---|---|
| 6,795,784 B1 * | 9/2004 | Shepard | ....................... 702/82 |
| 7,016,569 B2 * | 3/2006 | Mule et al. | ..................... 385/37 |
| 7,050,857 B2 * | 5/2006 | Samuelsson et al. | .......... 607/60 |
| 7,156,655 B2 * | 1/2007 | Sachdeva et al. | .............. 433/24 |
| 7,222,306 B2 * | 5/2007 | Kaasila et al. | .............. 715/801 |

FOREIGN PATENT DOCUMENTS

| | | |
|---|---|---|
| JP | 2002-535938 | 10/2002 |
| JP | 2004-310585 | 11/2004 |
| WO | WO 00/44181 | 7/2000 |

\* cited by examiner

*Primary Examiner*—Yosef Kassa
(74) *Attorney, Agent, or Firm*—Nutter McClennen & Fish LLP; John J. Penny, V

(57) ABSTRACT

An image processing content determining apparatus 100, a computer readable medium storing thereon an image processing content determining program and an image processing determining method being capable of determining the content of an image processing with simple operation is provided. The image processing content determining apparatus includes: a basic figure generating section for generating a basic figure 400; a transformed figure generating section 140 including a transformed figure displaying section for superimposing transformed images 410, 420, 430 and 440 obtained by transforming the basic figure 400 according to a transform instruction received from outside on input images 310, 320, 340 and 350 and for displaying the same; and an amount of transform calculating section for calculating the content of a processing to transform the transformed images 410, 420, 430 and 440 currently displayed to the basic figure 400.

10 Claims, 12 Drawing Sheets

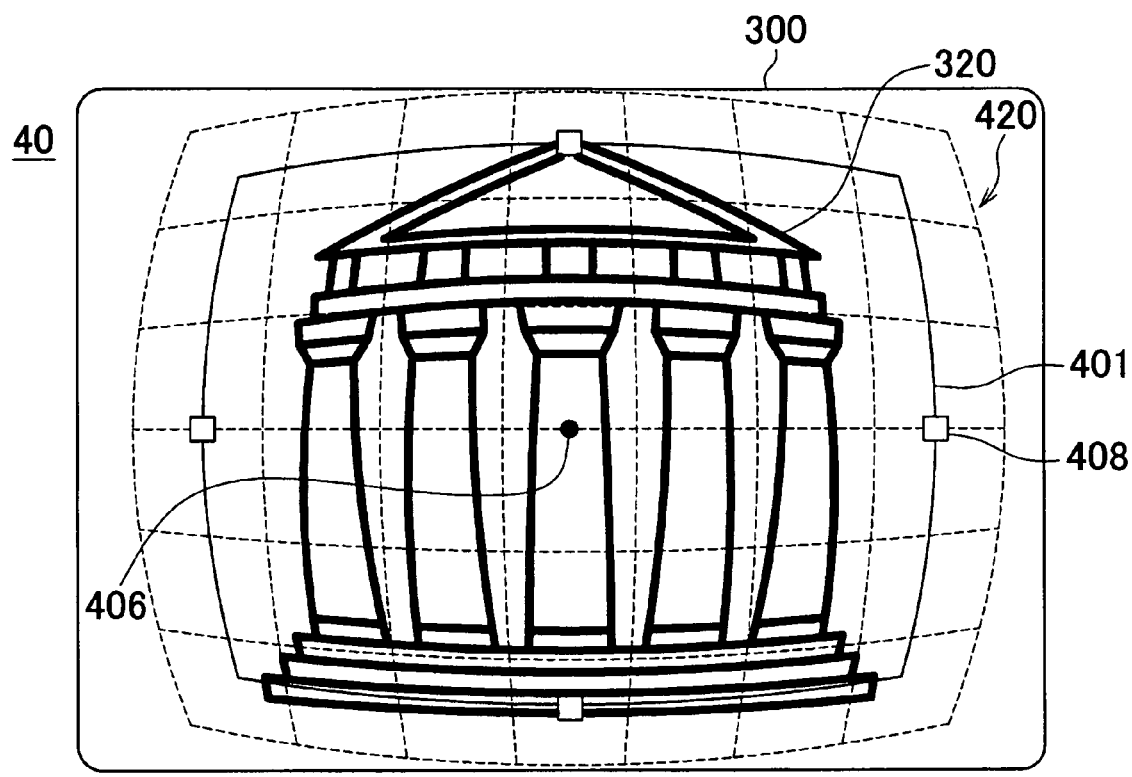
F I G . 6

IMAGE PROCESSING CONTENT DETERMINING APPARATUS, COMPUTER READABLE MEDIUM STORING THEREON IMAGE PROCESSING CONTENT DETERMINING PROGRAM AND IMAGE PROCESSING CONTENT DETERMINING METHOD

CROSS REFERENCE TO RELATED APPLICATION

The present application claims priority from a Japanese Patent Applications No. 2005-232125 filed on Aug. 10, 2005, the contents of which are incorporated herein by reference. The invention also relates to a Japanese Patent Application Publication No. 2004-310585, the contents of which are also incorporated herein by reference.

BACKGROUND OF THE INVENTION

1. Field of the Invention

The present invention relates to an image processing content determining apparatus, a computer readable medium storing thereon an image processing content determining program and an image processing content determining method. Specifically, the present invention relates to an image processing content determining apparatus, a computer readable medium storing thereon an image processing content determining program and an image processing content determining method for determining a processing content including a method of processing and the amount of processing discrete image information.

2. Related Art

In order to edit a raster image, more computation process is required than vector data because the raster image is a group of pixels which does not include information on the arrangement therein. Particularly, the color depth and the range for gradation of the raster image are enlarged recently, so that the amount of data processing to reflect the result of editing on image data. Accordingly, if the image is changed on a screen in real time according to the operation of a user, the reaction of the screen slows down all the more and the operationality is reduced sometime. Thus, most image editing means previously designate a method of processing and the amount of processing by a numerical value, and collectively process the whole of images.

Meanwhile, an image captured by a digital camera has various distortions which are ineluctably occurred in an optical system at image capturing. Therefore, even ordinary users who do not know well to use an image processing software and an image processing apparatus mostly perform an image editing to correct the distortion of the image. However, it is extremely difficult for the user who does not have a certain level of skill to obtain a desired editing result through an editing operation with indirectly designating by numerical values.

Then, a technology for embedding grid information in image information as a reference to an editing history in order to easily go back the editing history and return to the state before the editing has been disclosed, for example, in Japanese Patent Application Publication No. 2004-310585. Here, even if the editing is failed, a user who does not have a certain level of skill can easily edit images because the original model is secured and trial and error are permitted.

However, in the above disclosed conventional art, if an image is transformed based on the orthogonal grid, the grid is transformed as well as the image. That is to say, the orthogonal grid is corresponded to the image before being edited and the transformed grid is corresponded to the image after being edited. Therefore, when the image before being edited has any distortion due to an optical system and the distortion will be corrected, an appropriate method of transforming an image to remove the distortion and the amount of transform of the edited image are expected, and the instruction is inputted to an image processing apparatus in the above-described conventional art. Accordingly, the amount of transform should be made trial and error, or a sufficient skill is required to remove the distortion from the image to correct the same, for example.

SUMMARY OF THE INVENTION

To solve the above-described problem, a first aspect of the present invention provides an image processing content determining apparatus. The image processing content determining apparatus includes: a basic figure generating section for generating a basic figure; a transformed figure displaying section for superimposing a transformed image obtained by transforming the basic figure according to a transform instruction received from outside on an input image and displaying the same; and an image processing content calculating section for calculating the content of a processing to transform the transformed figure currently displayed to the basic figure according to a determination instruction received from outside. Thereby various processing methods can be appropriately selected with an appropriate amount of processing. Therefore, an image correction apparatus being capable of easily and certainly correcting any distortion of an image can be provided.

Additionally, according to an embodiment, the transformed figure displaying section in the image processing content determining apparatus may receive a transform instruction inputted to at least one of the displayed transformed figure and basic figure through a pointing device. Thereby the processing content can be easily determined and the processing content can be adjusted with the instruction by a user.

Additionally, according to another embodiment, the image processing content determining apparatus may further include a correlation instruction receiving section for receiving a correlation instruction on the correlation between the basic figure and the input image from outside. The basic figure generating section may generate the basic figure based on the correlation instruction received by the correlation instruction receiving section. Thereby the processing content can be determined with an intuitive processing.

Additionally, according to another embodiment, the processing content calculating section may calculate the amount of processing of the transform processing and determine the processing content based on the calculated amount of processing. Thereby an appropriate processing method and the amount of processing can be easily and certainly determined without knowledge of the operation.

Additionally, according to another embodiment, the transformed figure displaying section may display a transformed figure obtained by transforming the basic figure equivalent to the case that aberration, keystone distortion or tilt is generated in the input image. Thereby an image correction apparatus being capable of easily and certainly correcting various distortions such as the aberration, the keystone distortion and the tilt.

Additionally, according to another embodiment, the basic figure may include a vertical line and a horizontal line. Thereby the transformed figure may be easily fitted to the components of image to be processed, so that the operation can be more easily performed.

Additionally, according to another embodiment, the transformed figure displaying section may display a transformed figure obtained by transforming the basic figure along a line which should be a horizontal line or a vertical line among lines included in the input image. Thereby the number of procedures for determining the processing content can be reduced. Additionally, a subsequent processing can be indicated to assist the operation of a user.

Additionally, according to another embodiment, the image processing content determining apparatus may further include a processed image generating section for transforming the input image according to a processing content calculated by the processing content calculating section to generate a processed image. Thereby the processing content can be easily checked, and the subsequent processing can be intuitively indicated.

Further, a second aspect of the present invention provides a computer readable medium storing thereon an image processing content determining program. The image processing content determining program causes a information processor to operate as: generating a basic figure; superimposing a transformed image obtained by transforming the basic figure according to a transform instruction received from outside on an input image and displaying the same; and calculating the content of a processing to transform the transformed figure currently displayed to the basic figure according to a determination instruction received from outside. Thereby the above-described effect can be obtained using not only a dedicated apparatus but also a general-purpose information processor.

Further, a third aspect of the present invention provides an image processing content determining method. The image processing content determining method includes the steps of: generating a basic figure; superimposing a transformed image obtained by transforming the basic figure according to a transform instruction received from outside on an input image and displaying the same; and calculating the content of a processing to transform the transformed figure currently displayed to the basic figure according to a determination instruction received from outside. Thereby the above-described effect can be obtained regardless of hardware resources.

BRIEF DESCRIPTION OF THE DRAWINGS

FIG. 6 shows another screen 300 of the display device 180 in steps S104-S107;

DETAILED DESCRIPTION OF THE INVENTION

Hereinafter, the present invention will now be described through referred embodiments. The embodiments do not limit the invention according to claims and all combinations of the features described in the embodiments are not necessarily essential to means for solving the problems of the invention.

Figure 1:
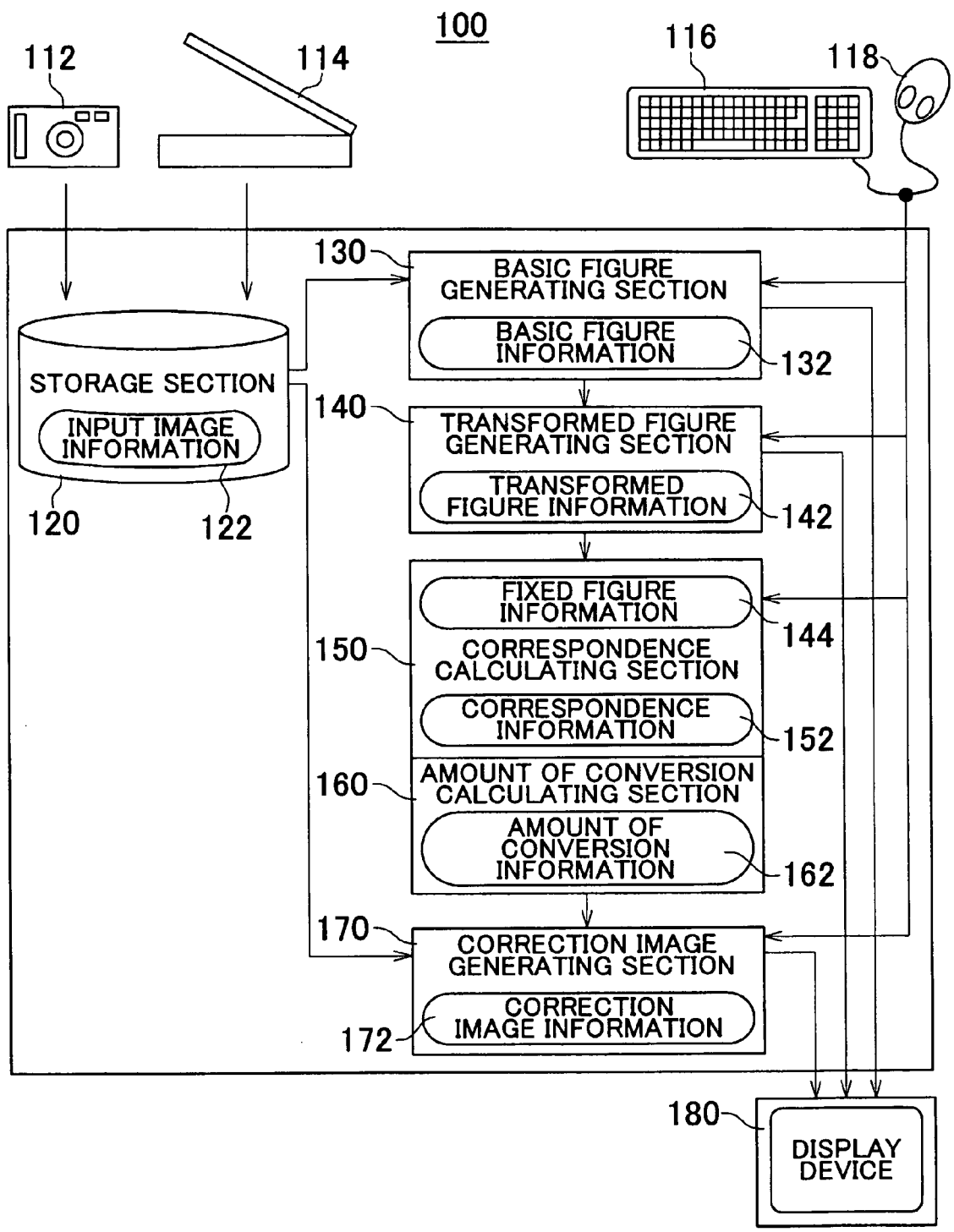
FIG. 1 is a schematic diagram showing the structure of an image correction apparatus 100 according to an embodiment of the image processing content determining apparatus.

FIG. 1 is a schematic diagram showing the structure of an image correction apparatus 100 according to an embodiment of the image processing content determining apparatus. As shown in FIG. 1, the image correction apparatus 100 includes a storage section 120 for storing an image rasterized by a digital camera 112 and a scanner 114 as input image information 122, and a basic figure generating section 130, a transformed figure generating section 140, a correspondence calculating section 150, an amount of conversion calculating section 160 and a correction image generating section 170 which perform a data processing in each processing step described later.

Receiving an instruction to start a correction processing from a user through an input device such as a keyboard 116 and a pointing device 118, the basic figure generating section 130 reads the input image information 122 from the storage section 120 during generating basic figure information 132 as a guideline for the correction processing and storing the same. Additionally, the basic figure generating section 130 superimposes the input image information 122 and the basic figure information 132 and displays an image obtained by combining the input image information 122 and the basic figure information 132 on the display device 180.

Receiving an instruction on transforming from the user through the input device such as the keyboard 116 and the pointing device 118, the transformed figure generating section 140 performs a transform processing on the basic figure information 132 generated by the basic figure generating section 130 and generates transformed figure information 142. Additionally, the transformed figure generating section 140 has a function as a transformed figure displaying section for superimposing the transformed figure information 142 as substitute for the basic figure information 132 on the input image information 122 and displaying the same on the display device 180. The transformed figure generating section 140 stores a transformation to transform a basic image to a transformed image in association with the type of a transform method. Then, the transformed figure generating section 140 generates the transformed image according to the transformation on the basis that the user designates the type of the transform method and inputs the amount of transform. Here, the type of the transform method may be a transform processing to correct an aberration such as barrel distortion and pin-cushion distortion, a transform processing to correct keystone distortion due to a camera movement and a rotating processing to correct the tilt of an image due to the tilt of a camera.

Receiving an instruction indicating that the amount of transform of the transform processing from the user through the input device such as the keyboard 116 and the pointing device 118 is determined, the correspondence calculating section 150 stores information on the transformed figure displayed currently on the display device 180 as fixed figure information 144. Then, the correspondence calculating section 150 calculates the correspondence between the fixed figure information 144 and the input image information 122. Thereby the fixed figure information 144 and the input image information 122 can be associated with each other. The amount of conversion calculating section 160 refers the fixed figure information 144 and calculates the amount of conversion information 162 required for a processing to convert the fixed figure information 144 to the basic figure information 132. Thus, the processing content for the input image information is calculated. That is to say, the basic figure generating section 130, the transformed figure generating section 140 and the amount of transform calculating section 160 in the image correction apparatus 100 are examples of image processing content determining apparatus.

The correction image generating section 170 refers the correspondence information 152 and the amount of conversion information 162 and performs a conversion processing on the input image information 122, which is equivalent to a conversion processing to return the fixed figure information 144 to the basic figure information 132. Thereby correction image information 172 is generated from the input image information 122. Additionally, the correction image generating section 170 displays the correction image information 172 on the display device 180 as an image.

Figure 2:
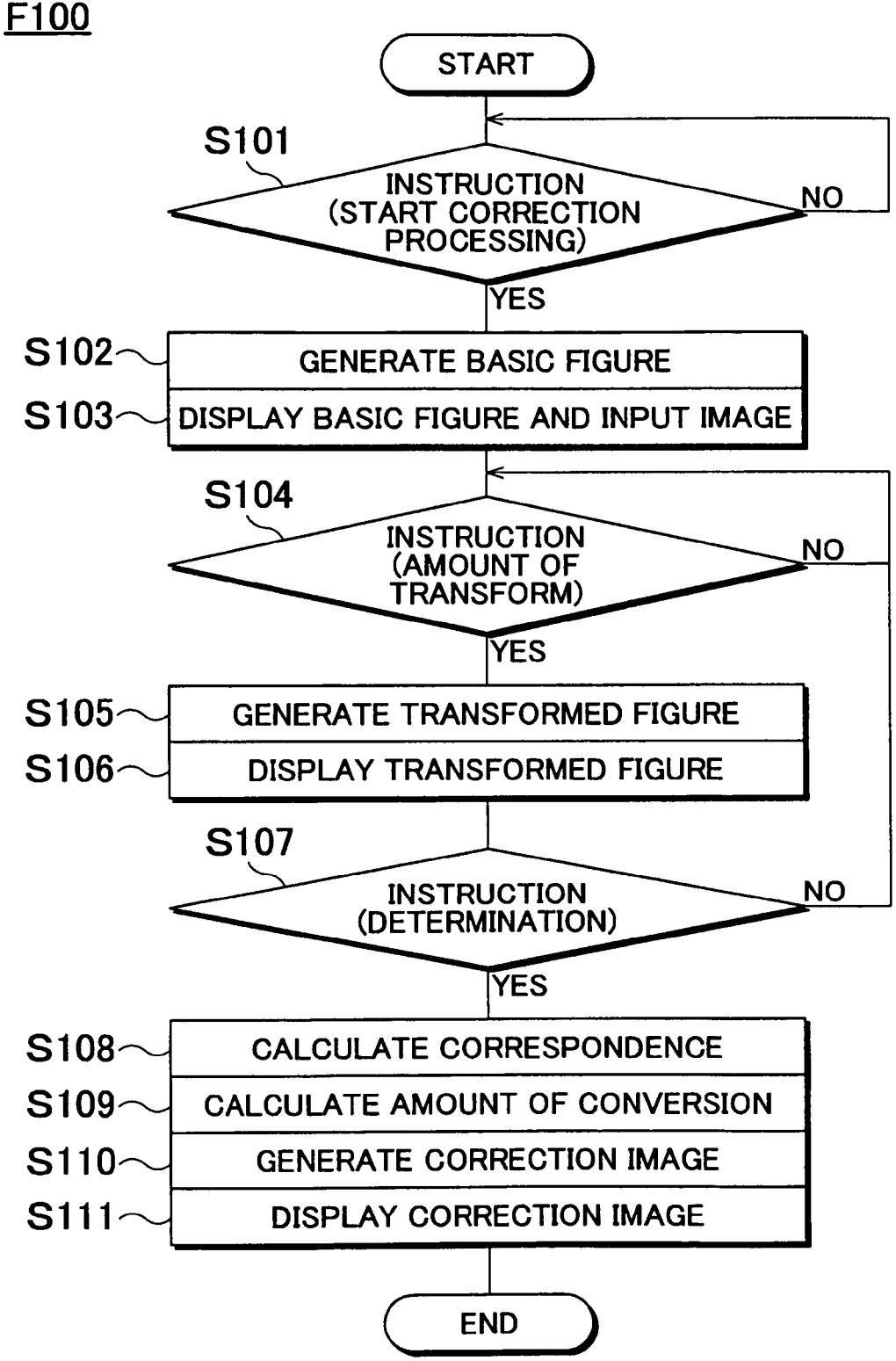
FIG. 2 is a flowchart showing a process in the image correction apparatus 100.

FIG. 2 is a flowchart F100 showing a processing of an image processing content determining program executed in the image correction apparatus 100. As shown in FIG. 2, the basic figure generating section 130 of the image correction apparatus 100 waits for an input of an instruction to start a correction processing (S101). Receiving the input of the instruction (S101: Yes), the basic figure generating section 130 generates a basic figure (S102), superimposes the basic figure on the input image and displays the same on the display device 180 (S103). Here, the instruction to start the correction processing includes the type of the transform method appropriate for the correction processing.

Next, the transformed figure generating section 140 waits for a designation of the amount of transform being a value of parameter in the designated transform method (S104). Receiving the input of the instruction to designate the amount of transform (S104: Yes), the transformed figure generating section 140 generates a transformed figure obtained by transforming the basic figure according to the amount of transform inputted (S105). Additionally, the transformed figure generating section 140 converts the generated transformed figure to the basic figure and superimposes the same on the input image to display the same on the display device (S106).

Accordingly, the user who instructs the amount of transform in the S105 can visually recognize the amount of conversion in the S106. Additionally, the transformed figure corresponding to the amount of transform is superimposed on the input image to display the same, so that the user can easily know the amount of transform necessary for the appropriate correction. The series of processing from the step S104 to the step S105 is repeated until the instruction to determine the amount of transform is inputted to the correspondence calculating section 150 (S107: No).

That is to say, when the instruction to determine the amount of transform is inputted in the step S107 (S107: Yes), the correspondence calculating section 150 captures the transformed figure currently displayed as the fixed transformed figure and calculates the correspondence between the fixed transformed figure and the input image (S108). Here, the correspondence according to the present embodiment may include information indicative of the relative position between each pixel of the input image formed as a group of pixels and the fixed transformed figure.

Then, the amount of conversion calculating section 160 calculates the amount of conversion necessary to perform a conversion processing to return the transformed figure to the basic figure based on the fixed figure information (S109). The amount of conversion may be newly calculated by referring the original basic figure and the fixed transformed figure, and also may be calculated based on the accumulation of the instructions inputted to the transformed figure generating section 140 in the S104.

Next, the correction image generating section 170 refers the correspondence calculated in the step S108 and the amount of conversion calculated in the step 109 and performs a transform processing equivalent to the processing to convert the transformed figure to the basic figure on the input image. Thereby the correction image generating section 170 generates a correction image (S110). Additionally, the correction image generating section 170 displays the generated correction image on the display device 180 (S111).

As evidenced by the above description, the processing content including the method of image processing and the amount of processing is determined through the steps S102, S104, S105, S106, S107 and S119 in the above described series of processing. Here, the transformed figure is corresponded to the input image before correcting, and the basic figure is corresponded to the correction image after correcting. Therefore, the user can input the amount of transform as viewing the transformed figure on the screen of the display device 180 and transform the transformed figure on the screen in order to fit the transformed figure to the distortion included in the input image to easily obtain the correction image in which the distortion is corrected.

Figure 3:
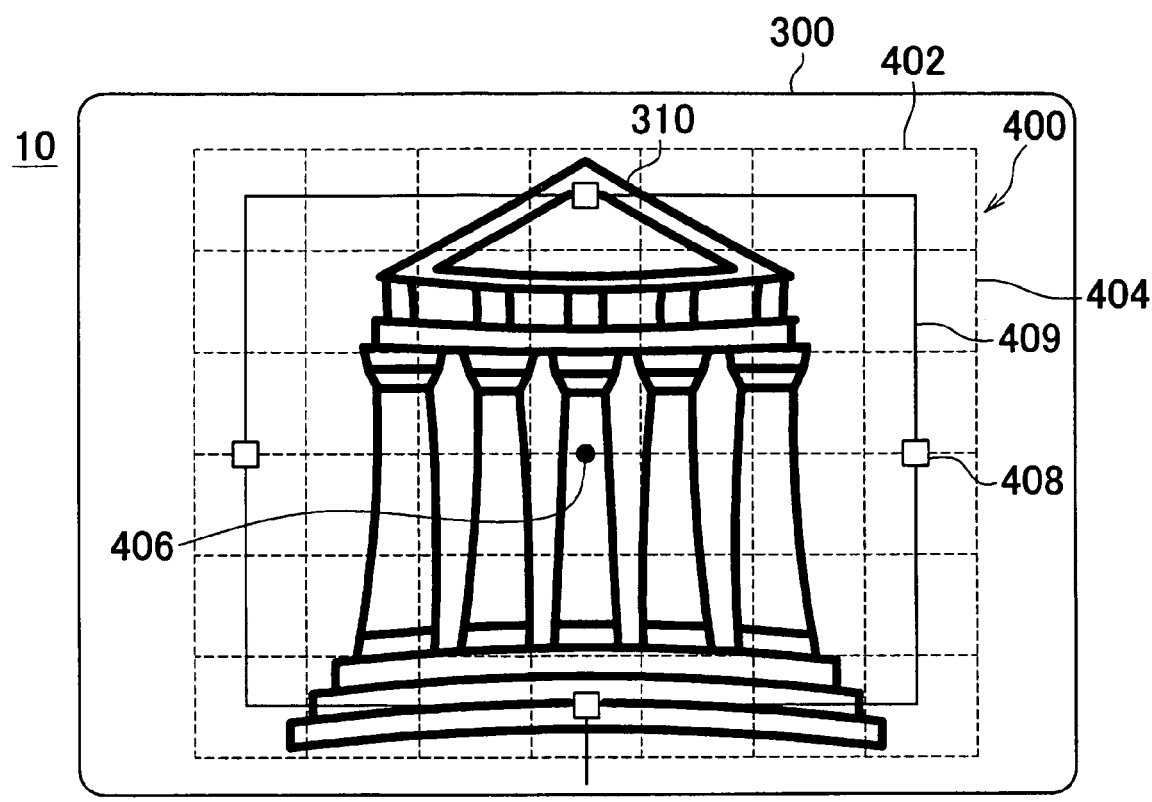
FIG. 3 shows a screen 300 of a display device 180 in step S103.

FIG. 3 shows an example of a display screen 10 on the screen 300 of the display device 180 displayed by the basic figure generating section 130 in the step S103 of the flowchart F100. In FIG. 3, an input image 310 and a basic figure 400 are overlapped and displayed.

Here, the input image 310 displayed in FIG. 3 includes a so-called pin-cushion distortion. The basic figure 400 may be a grid figure including a plurality of horizontal lines 402 and a plurality of vertical lines 404. Additionally, the basic figure 400 includes a rectangle guide figure 409, a handle 408 disposed at the middle point of each edge of the guide figure 409 and a handle 406 which is a back point disposed at the center.

The handles 406 and 408 may be moved on the screen 300 by dragging the pointing device 118. Thereby the amount of conversion is indicated to the transformed figure generating section 140, and the basic figure 400 can be transformed to the transformed figure 410 on the screen 300. Here, the dragging is performed by moving the pointer as operating a switch included in the pointing device 118 or a modifier key of the keyboard 116.

Figure 4:
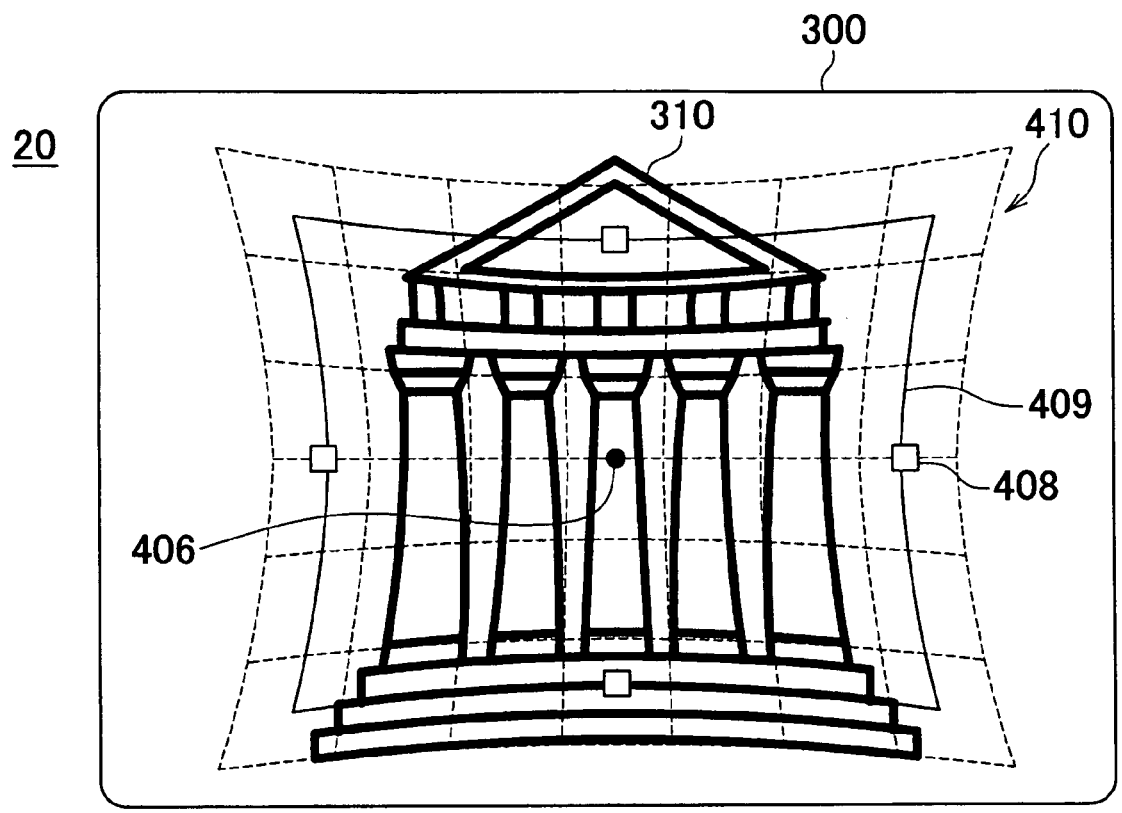
FIG. 4 shows the screen 300 of the display device 180 in steps S104-S107.

FIG. 4 shows a display screen 20 displayed on the screen 300 of the display device 180 in the operations of steps S104-S107 which are executed with reference to the display image. Here, the components the same as those in FIG. 3 have the reference numerals the same as those in FIG. 3 so that the repeated description is omitted.

As shown in FIG. 4, a transformed figure 410 generated by the transformed figure generating section 140 is displayed as substitute for the basic figure 400. Additionally, a guide figure 409 is also transformed according to the transformed figure 410. At this time, each curved line constituting the transformed figure 410 and the guide figure 409 draws the curved line the same as distortion generated in the image due to aberration of the optical system of a camera.

Such transform is generated as the result that the user operates the handle 408 through the pointing device 118 in order that the handle 408 is moved to come to the center of the screen 300. At this time, the user can input the instruction of the amount of transform of the transformed figure 410 based on the amount of movement of the handle 408. Additionally, the user can instruct the amount of transform appropriate for correcting the pin-cushion distortion by transforming the horizontal lines or the vertical lines constituting the transformed figure 410 and the guide figure 409 such that the horizontal lines or the vertical lines are transformed along the figure which can be recognized as the horizontal line and the vertical line included in the input image.

Then, the input image 310 in the screen 300 is not transformed but displayed thereon until an input of the determination instruction from the user is received in FIG. 4. Therefore, even if the amount of data for the input image 310 is large, the basic image 400 of which amount of data is significantly smaller than that of the input image 310 is transformed to a transformed figure 410 and displayed, so that the reaction on the screen is faster than the case that the input image 310 in itself is corrected corresponding to the amount of transform in real time. Therefore, the operationality for the user can be prevented from reducing.

Figure 5:
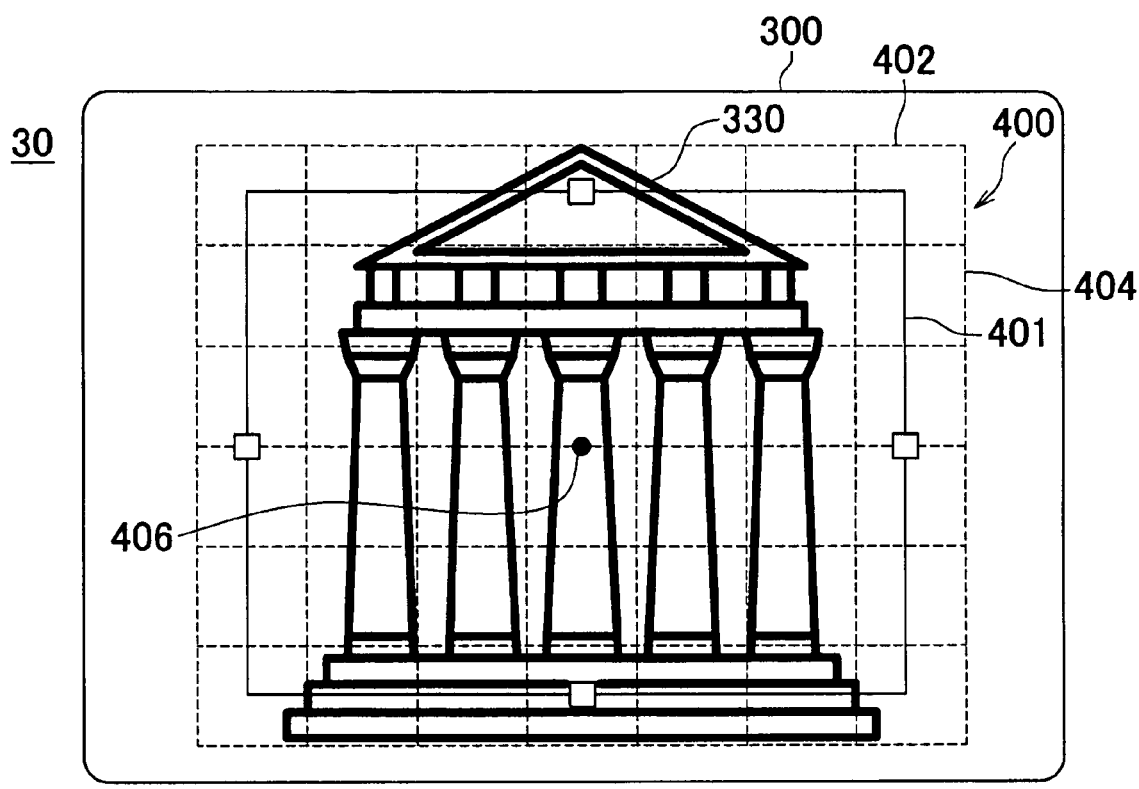
FIG. 5 shows the screen 300 of the display device 180 in step S111.

FIG. 5 shows a display screen 30 displayed on the screen 300 of the display device 180 by the correction image generating section 170 in step S111. As shown in FIG. 5, a correction image 330 in which the pin-cushion distortion is removed is displayed on the correction image 330.

As described above, the transformed image 410 is corresponded to the input image 310 before correcting, and the reference image is corresponded to the correction image 330 after correcting. Accordingly, the user inputs the amount of transform as viewing the transformed figure 410 on the screen 300 of the display device 180 and transforms the transformed image 410 on the screen 300 so as to fit the distortion in the input image 310, so that the correction image 330 in which the distortion is corrected can be easily obtained.

Here, even if the input image includes a barrel distortion due to aberration as an input image 320 displayed on a display screen 40 as shown in FIG. 6, the handle 408 is moved toward the outside of the screen 300, so that a transformed image 420 can be along the input image 320. Thus, the barrel distortion can be accurately corrected through the above-described procedure.

Additionally, however the figure of the operation is omitted, a black circle of handle 406 is operated to move the whole of basic figure 400 and the whole of transformed figure 410. Thereby the center location which will be the reference of a transform processing can be changed.

Additionally, the basic figure 400 is displayed along with the correction image 330 in FIG. 5, however, the basic figure is not always have to be displayed in the present step.

Further, the transform processing of the transformed figures 410 and 420 by the transformed figure generating section 140 in the step S160 can be automatized to some extent. That is to say, if a horizontal line or a vertical line in the input image 310 can be expected from a large line segment in the image, the basic figure 400 can be automatically fitted to the horizontal line or the vertical line to be the transformed figure 410. However, in this case, it is preferred that the horizontal line or the vertical line in the input image 310 which is automatically extracted can be changed to the other line segment based on an input by the user. Additionally, even if the transformed figure can not be automatically generated, the horizontal line 402 or the vertical line 404 constituting the basic figure 400 are displayed along the large line segment extracted from the input image, so that the user can perform the next operation easier. Here, when the transformed figure 410 is displayed from the beginning, the display of the basic figure (S103) in FIG. 2 can be omitted.

Figure 7:
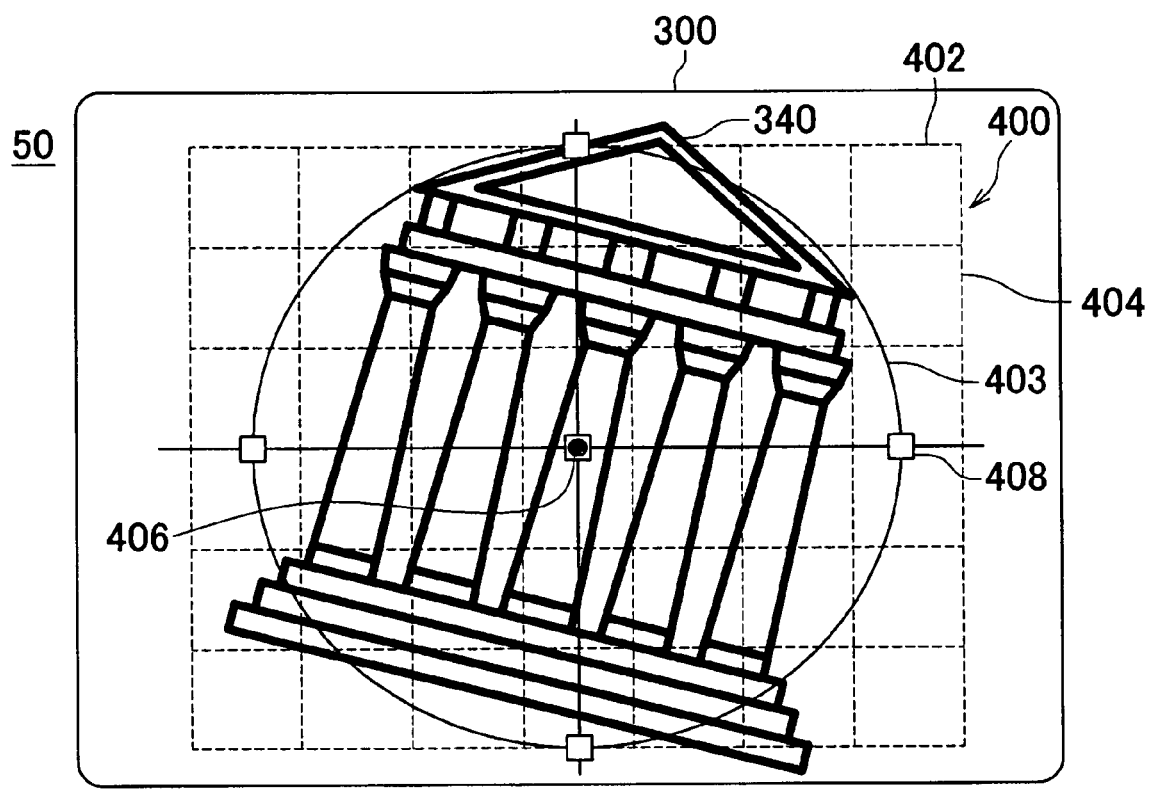
FIG. 7 shows another screen 300 of the display device 180 in step S103.

FIG. 7 shows a display screen 50 displayed on the screen 300 obtained by superimposing the other input image 340 with the basic figure 400. As shown in FIG. 7, the input image tilts. Therefore, a correction processing to rotate the image is performed in order to correct the input image 340.

As shown in FIG. 7, the basic figure 400 is superimposed on the input image 340 on the screen 300 and is displayed. However, the transform processing in this time i.e. a rotating processing is different from the correction processing on the aberration in the input image 310 shown in FIG. 3 and FIG. 6. Here, the shape of the guide figure 403 and the position of the handle 408 included in the basic figure 400 is different from the case in FIG. 3. Thereby the user can intuitively check that the type of the transform processing which is designated by the user is the rotating processing.

Figure 8:
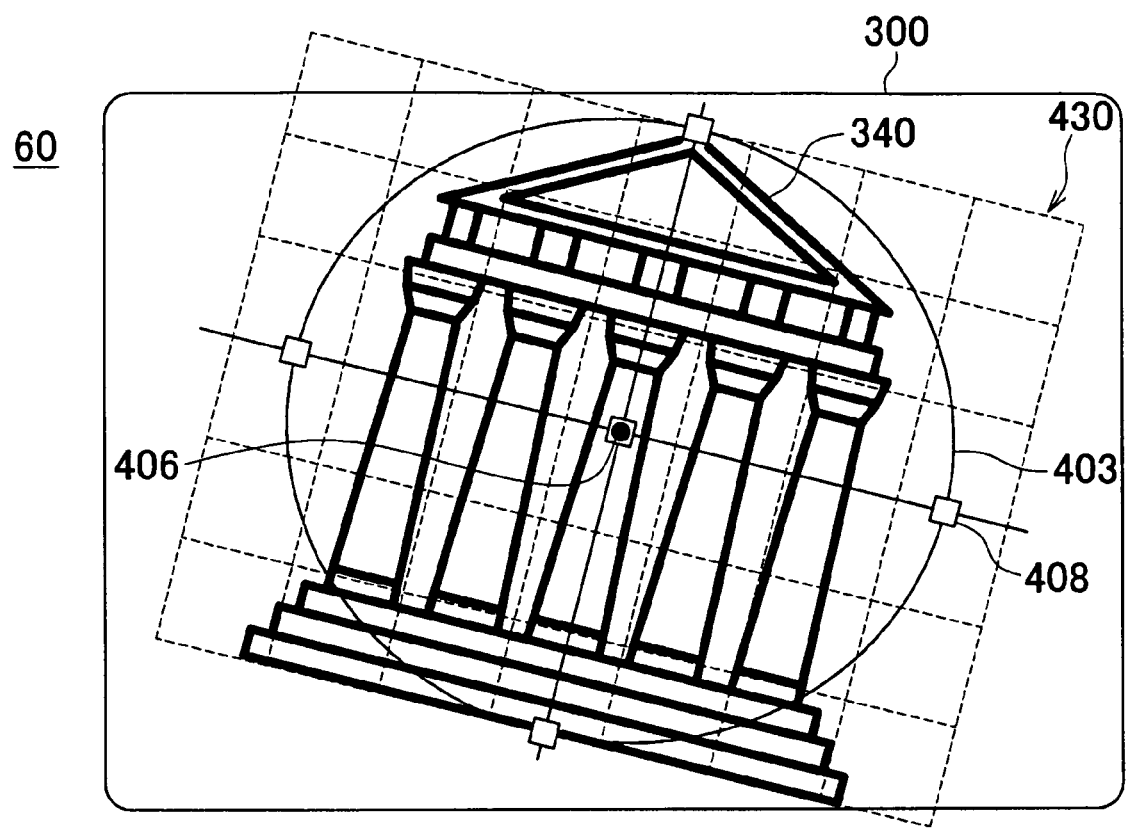
FIG. 8 shows another screen 300 of the display device 180 in steps S104-S107.

FIG. 8 shows a display screen 60 corresponding to the processing performed in the transformed figure 140, the correspondence calculating section 150 and the amount of conversion calculating section 160 in the steps S104-S107 regarding the input image 340 shown in FIG. 7. Here, the components the same as those of FIG. 7 have the reference numerals the same as those of FIG. 7, so that the repeated description is omitted.

As shown in FIG. 8, the transformed figure 430 displayed by the transformed figure generating section 140, which is displayed by operating the handle 408 is rotated around the handle 406 such that the horizontal line 402 or the vertical line 404 included in the basic figure 400 is in parallel with the horizontal line or the vertical line included in the input image 340. Accordingly, the correction image generating section 170 performs a transform processing equivalent to the processing to return the transformed figure 430 to the basic figure 400 on the input image 340 in the step S110. Thus, the correction image generating section 170 displays an upright correction image 330 on the display apparatus 180 as well as the display screen 30 in FIG. 5.

Figure 9:
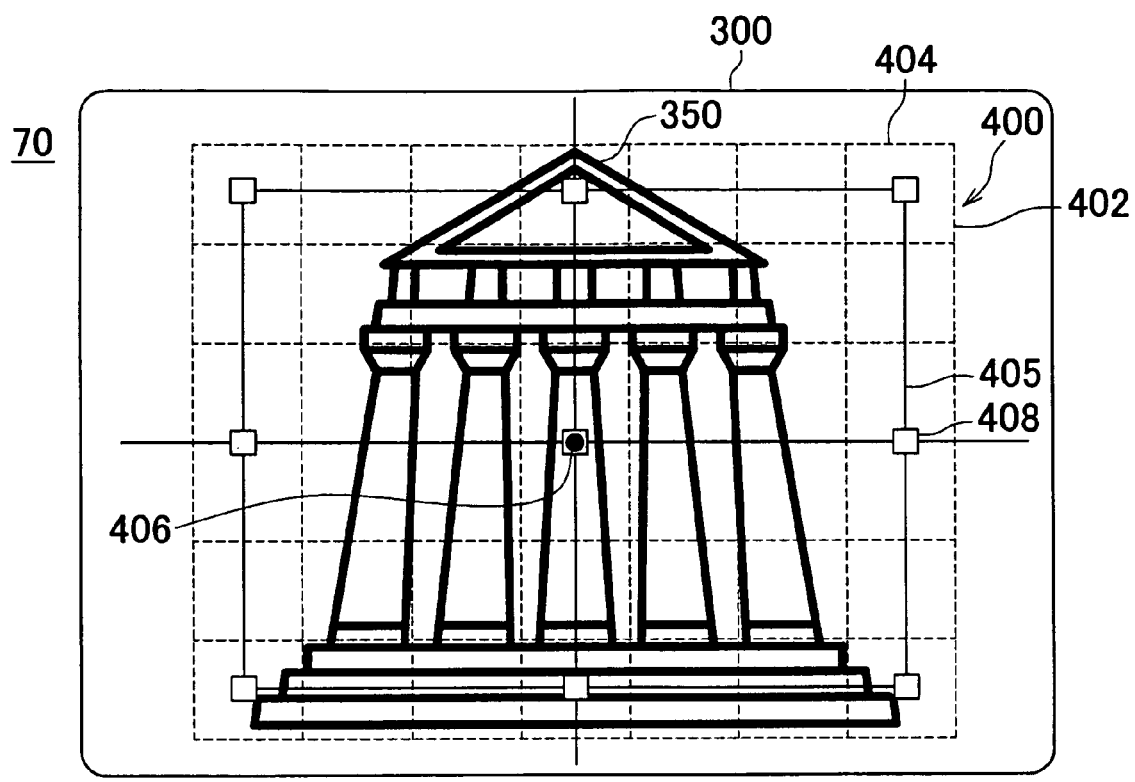
FIG. 9 shows further another screen 300 of the display device 180 in step S103.

FIG. 9 shows a display screen 70 displayed on the display apparatus 180, which is obtained by superimposing the basic figure 400 on the input image 350 by the basic figure generating section 130. As shown in FIG. 9, the input image 350 includes a so-called keystone distortion or trapezoidal distortion. Therefore, a transformed processing performed in the correction image generating section 170 in order to correct the input image 350 is different from the correction processing performed on the input images 310, 320 and 340 shown in FIG. 6 and FIG. 7. Accordingly, the shape of the guide figure 405 and the position of the handle 408 included in the basic figure 400 displayed by the basic figure generating section 130 are different from the above-described case as well.

Figure 10:
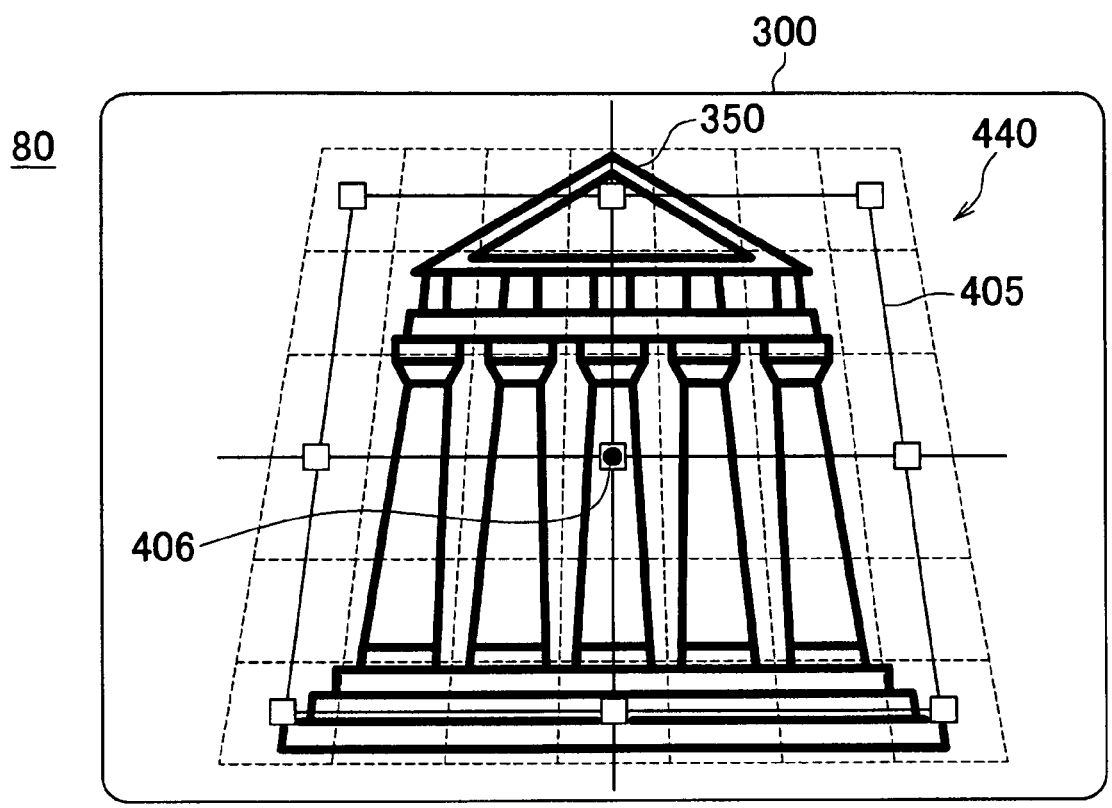
FIG. 10 shows further another screen 300 of the display device 180 in steps S104-S107.

FIG. 10 shows a display screen 80 displayed on the display device 180 by the transformed figure generating section 140 in the steps S104-107 regarding the input image 350 shown in FIG. 9. Here, the components the same as those of FIG. 9 have the reference numerals the same as those of FIG. 9, so that the repeated description is omitted.

As shown in FIG. 10, a trapezoidal transformed figure 440 which is transformed such that the bottom of the basic figure 400 is expanded along the trapezoidal distortion of the input image 350. Here, the transformed figure 440 is transformed such that the horizontal line and the vertical line included in the transformed figure 440 are along the input image 350 and then, the amount of transform is determined in step S107. Therefore, the amount of conversion calculating section 160 can obtain an appropriate amount of transform. Accordingly, the correction image generating section 170 can display the correction image 330 in which the keystone distortion is corrected on the display device 180 in the step S111.

Here, the trapezoidal distortion in the input image 350 may be occurred asymmetrically on the left and the right, or the top and the bottom of the image. Accordingly, when each of handles 408 is individually operated, it is preferred that the transformed figure 440 which is asymmetrical on the left and the right, or the top and the bottom can be generated.

Figure 11:
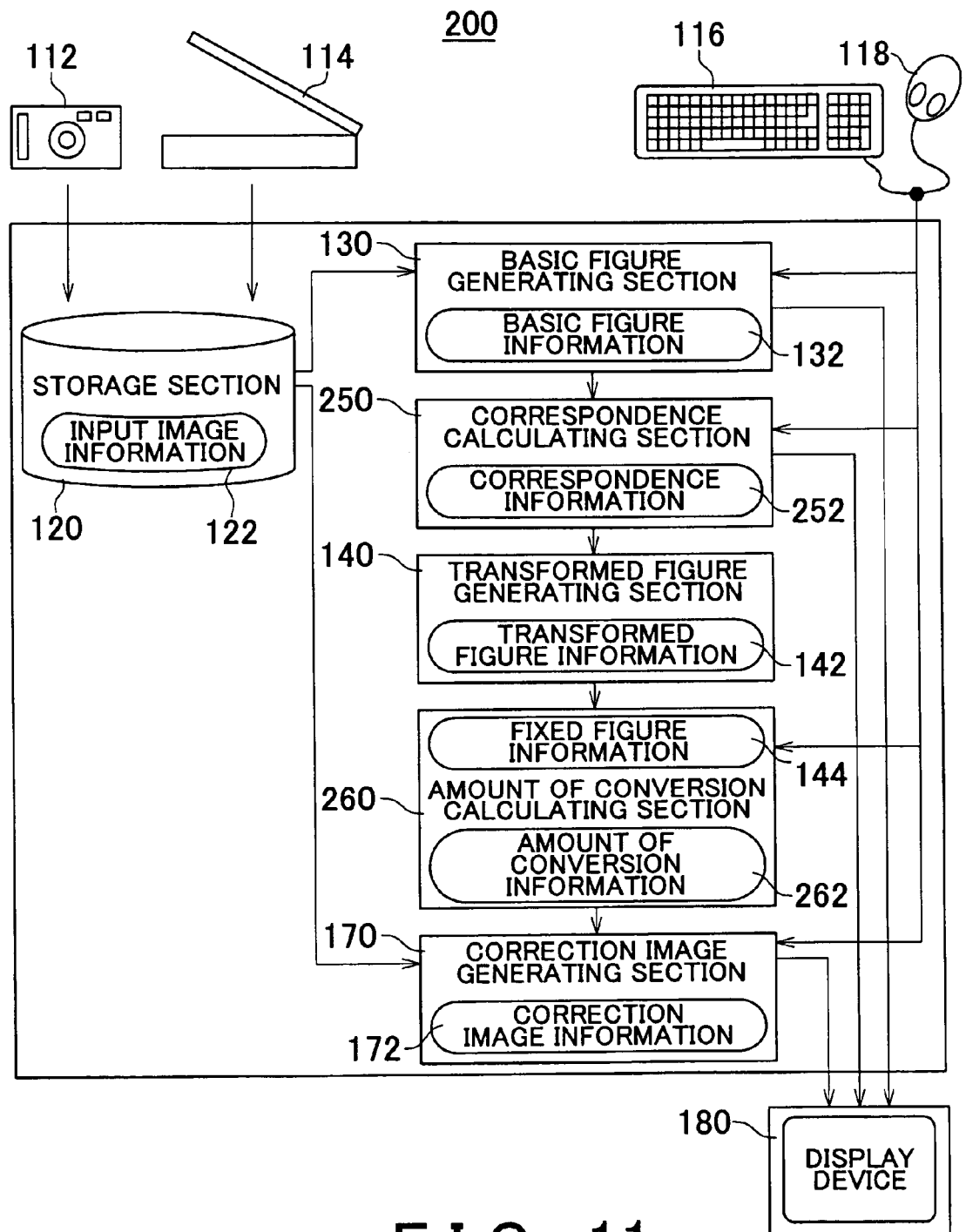
FIG. 11 is a schematic diagram showing the whole configuration of an image correction apparatus 200 according to another embodiment of the image processing content determining apparatus.

FIG. 11 is a schematic view showing another structure of the image correction apparatus 200 being capable of performing a correction processing. Here, the components the same as those of FIG. 1 have the reference numerals the same as those of FIG. 1, so that the repeated description is omitted.

As shown in FIG. 11, the image correction apparatus 200 is different from the image correction apparatus 100 shown in FIG. 1 in the extent that the correspondence calculating section 250 is disposed between the basic figure generating section 130 and the transformed figure generating section 140. Additionally, the image correction apparatus 200 is different from the image correction apparatus 100 shown in FIG. 1 in the extent that a correspondence information 252 calculated by the correspondence calculating section 250 is information indicative of the correspondence between the input image information 122 and the basic figure information 132.

However, also in the image correction apparatus 200, the correction image generating section 170 can refer correspondence information 252 and the amount of conversion information 262 to generate correction image information 172 from the input image information 122. The operation by the user on the series of processing is the same as that of the image processing apparatus 100 shown in FIG. 1. Further, in the image correction apparatus 200, the transformed figure generating section 140 has a function as the transformed figure displaying section, and the basic figure generating section 130. The transformed figure generating section 140 and the amount of transform calculating section 260 are examples of the image processing content determining apparatus.

Figure 12:
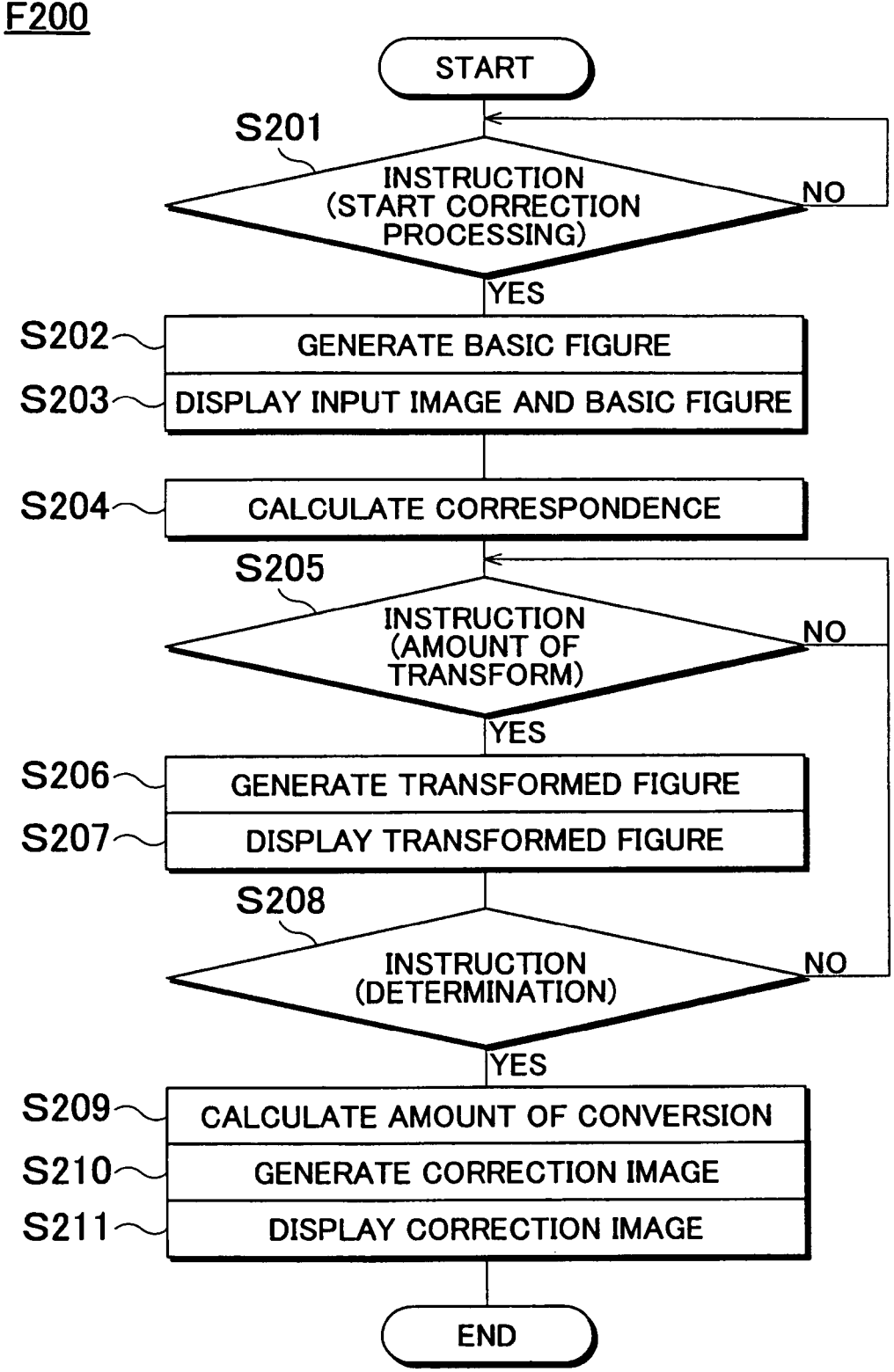
FIG. 12 is a flowchart showing a processing in an image correction apparatus 200.

FIG. 12 is a flowchart F200 showing a procedure of the correction processing in the image correction apparatus 200 shown in FIG. 11. Here, each procedure of steps S201-S203, S205-S208 and S209-S211 is the same as the steps S101-S103, S104-S107 and S109-S111 in the flowchart F100 shown in FIG. 2, and each content of the processing is also substantially the same. Here, it is different in the extent that the step 204 in which the correspondence calculating section 250 calculates the correspondence information 252 is performed following the step S203 in which the basic figure generating section 130 displays the input image and the basic figure. As described above, the operation of the user is not changed in this procedure, but the operation such as calculating the correspondence and calculating the amount of conversion, of which load is large can be dispersed on the other step. Additionally, the processing content including the method of image processing and the amount of processing can be determined through the steps S202, S205, S206 S207 S208 and S209 in the above-described series of processing According to the present embodiment as described above, the transformed image obtained by transforming the basic figure is fitted to the displayed input image with distortion, so that the distortion of the image can be certainly corrected with simple operation without transforming the basic figure as expecting the amount of transform of the input image.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An image processing content determining apparatus comprising:
   a basic figure generating section for generating a basic figure;
   a transformed figure displaying section for superimposing on an input image a transformed image obtained by transforming the basic figure according to a transform instruction received from outside and displaying the same; and
   a processing content calculating section for calculating the content of a processing to transform the transformed figure to the basic figure according to a determination instruction received from outside.

2. The image processing content determining apparatus according to claim 1, wherein the transformed figure displaying section receives the transform instruction inputted to at least one of the displayed transformed figure and basic figure by a pointing device.

3. The image processing content determining apparatus according to claim 1 further comprising a correlation instruction receiving section for receiving a correlation instruction on the correlation between the basic figure and the input image from outside, wherein
   the basic figure generating section generates the basic figure based on the correlation instruction received by the correlation instruction receiving section.

4. The image processing content determining apparatus according to claim 1, wherein the processing content calculating section calculates the amount of processing of the transform processing and determines the processing content based on the calculated amount of processing.

5. The image processing content determining apparatus according to claim 1, wherein the transformed figure displaying section displays the transformed figure obtained by transforming the basic figure equivalent to the case that aberration, keystone distortion or tilt is generated in the input image according to the transform instruction.

6. The image processing content determining apparatus according to claim 1, wherein the basic figure includes a vertical line and a horizontal line.

7. The image processing content determining apparatus according to claim 1, wherein the transformed figure displaying section displays the transformed figure obtained by transforming the basic figure along a line which should be a horizontal line or a vertical line among lines included in the input image.

8. The image processing content determining apparatus according to claim 1 further comprising a processed image generating section for transforming the input image according to the processing content calculated by the processing content calculating section and generating a processed image.

9. A non-transitory computer readable storage medium which stores thereon an image processing content determining program for causing an information processor to operate as:

generating a basic figure;

superimposing a transformed figure obtained by transforming the basic figure according to a transform instruction received from outside on an input image and displaying the same; and calculating the content of a processing to transform the transformed figure to the basic figure according to a determination instruction received from outside.

10. An image processing content determining method stored on a non-transitory computer readable medium for performing the method with an information processor, the method comprising:

generating a basic figure;

superimposing a transformed figure obtained by transforming the basic figure according to a transform instruction received from outside on an input image and displaying the same; and calculating the content of a processing to transform the transformed figure to the basic figure according to a determination instruction received from outside.

\* \* \* \* \*